United States Patent
Xiong et al.

(10) Patent No.: US 12,031,054 B2
(45) Date of Patent: Jul. 9, 2024

(54) AQUEOUS POLYURETHANE DISPERSIONS FOR ARTIFICIAL LEATHER APPLICATIONS

(71) Applicant: Dow Global Technologies LLC, Midland, MI (US)

(72) Inventors: Jiawen Xiong, Shanghai (CN); Xiangyang Tai, Shanghai (CN)

(73) Assignee: Dow Global Technologies LLC

( * ) Notice: Subject to any disclaimer, the term of this patent is extended or adjusted under 35 U.S.C. 154(b) by 576 days.

(21) Appl. No.: 17/281,622

(22) PCT Filed: Oct. 8, 2018

(86) PCT No.: PCT/CN2018/109290
§ 371 (c)(1),
(2) Date: Mar. 31, 2021

(87) PCT Pub. No.: WO2020/073155
PCT Pub. Date: Apr. 16, 2020

(65) Prior Publication Data
US 2021/0371698 A1    Dec. 2, 2021

(51) Int. Cl.
| | |
|---|---|
| *C09D 175/12* | (2006.01) |
| *C08G 18/12* | (2006.01) |
| *C08G 18/48* | (2006.01) |
| *C08G 18/75* | (2006.01) |
| *D06N 3/14* | (2006.01) |

(52) U.S. Cl.
CPC ........... *C09D 175/12* (2013.01); *C08G 18/12* (2013.01); *C08G 18/4808* (2013.01); *C08G 18/4825* (2013.01); *C08G 18/4841* (2013.01); *C08G 18/755* (2013.01); *D06N 3/148* (2013.01); *D06N 2203/068* (2013.01); *D06N 2205/023* (2013.01)

(58) Field of Classification Search
CPC .. C09D 175/12; C08G 18/12; C08G 18/4808; C08G 18/4825; C08G 18/4841; C08G 18/755; D06N 3/148; D06N 2203/068; D06N 2205/023
See application file for complete search history.

(56) References Cited

U.S. PATENT DOCUMENTS

| | | | |
|---|---|---|---|
| 3,294,724 A | 12/1966 | Alexrood | |
| 4,039,517 A * | 8/1977 | Hamamura | B32B 5/022 525/460 |
| 5,508,340 A * | 4/1996 | Hart | C08G 18/4887 524/591 |
| 6,087,440 A | 7/2000 | Skaggs | |
| 7,495,058 B2 * | 2/2009 | Kitada | C08J 7/046 525/453 |
| 7,754,809 B2 | 7/2010 | Stollmaier | |
| 2004/0116594 A1 * | 6/2004 | Bhattacharjee | C08G 18/4202 524/589 |
| 2006/0116454 A1 | 6/2006 | Erdem et al. | |
| 2015/0329751 A1 | 11/2015 | Stache | |

FOREIGN PATENT DOCUMENTS

| | | |
|---|---|---|
| CN | 1396933 A | 2/2003 |
| CN | 1723226 A | 1/2006 |
| CN | 101283014 A | 7/2020 |
| WO | 00/61651 A | 10/2000 |
| WO | 01/55237 A | 8/2002 |
| WO | 2004/041890 A | 5/2004 |

* cited by examiner

*Primary Examiner* — Jane L Stanley

(57) ABSTRACT

Aqueous polyurethane dispersions are useful for making artificial leather and similar products. The dispersions contain polyurethane-urea particles dispersed in an aqueous phase. The particles are made using isophorone diisocyanate, certain cyclic amine chain extenders and certain polyol mixtures.

9 Claims, No Drawings

AQUEOUS POLYURETHANE DISPERSIONS FOR ARTIFICIAL LEATHER APPLICATIONS

This invention relates to aqueous polyurethane dispersions and artificial leather made using aqueous polyurethane dispersions.

Polyurethane artificial leather products are made from of polyurethane particles that are dispersed in a liquid. Although in the past the liquid phase often was an organic solvent, environmental and worker exposure concerns have driven the industry to using aqueous dispersions that contain at most small amounts of volatile organic compounds.

Aqueous polyurethane dispersions are made by first preparing an isocyanate-terminated liquid prepolymer, dispersing that prepolymer into water, and reacting the prepolymer with a chain extender to produce the polyurethane particles.

The prepolymer is made by reacting one or more polyols with a polyisocyanate. In general, there are two main classes of polyols used to make these prepolymers. One class is polyester polyols, and the other is polyether polyols. Each provides distinct advantages and disadvantages when the dispersion is used to make artificial leather and similar products.

Polyester polyol-based polyurethane dispersions have been greatly favored over polyether polyol-based types. The primary reason for this is their superior mechanical properties. The polyester polyol-based dispersions tend to form artificial leather products that have higher tensile strength and modulus, and higher tear strength. These mechanical advantages are significant enough to overcome important disadvantages such as inferior hydrolytic stability, high cost and difficulty in manufacturing due to high prepolymer viscosity.

The polyether polyol types are very hydrolytically stable, less expensive and easy to manufacture, but are disfavored due to their mechanical properties. A polyurethane dispersion that provides the advantage of both polyester polyol-based and polyether-polyol-based dispersion would be very desirable.

This invention in one aspect is an aqueous polyurethane dispersion comprising a liquid aqueous phase containing an external surfactant and dispersed nonioinic polyurethane particles, and containing no more than 0.5% by weight of organic compounds having a boiling point of less than 100° C. wherein the dispersed polyurethane particles are a reaction product of a nonionic polyurethane prepolymer and a diamine chain extender that contains a cycloaliphatic or aromatic ring structure, wherein the polyurethane prepolymer is a reaction product of an excess of isophorone diisocyanate with a polyol mixture, the polyol mixture of including i) at least one random and/or block copolymer of propylene oxide and ethylene oxide having a hydroxyl functionality of 2 to 3, a hydroxyl equivalent weight of 200 to 6000 and an oxyethylene content of 2 to 89% by weight of the copolymer and ii) at least one poly(ethylene oxide) monol or polyol having a molecular weight of 200 to 12,000, wherein the polyurethane prepolymer has an isocyanate content of 1 to 15% by weight of the prepolymer and a oxyethylene content of 1.5 to 20% by weight of the prepolymer.

Polyurethanes made by coagulating the dispersion of the invention exhibit properties (tensile strength, tensile modulus and high tear strength) similar to those made from polyester polyol-based dispersions, while retaining the benefits of polyurethanes made from polyether polyol-based dispersions. This combination of properties makes the dispersions very well suited for manufacturing artificial leather and elastomeric coatings.

The invention is also an artificial leather comprising at least one polyurethane layer formed by coagulating an aqueous polyurethane dispersion of the invention.

The invention is also a substrate having a coating layer, the coating layer comprising at least one polyurethane layer formed by coagulating an aqueous polyurethane dispersion of the invention.

The dispersion of the invention can be manufactured by first producing the nonionic polyurethane prepolymer, dispersing it into a liquid aqueous phase and then crosslinking the prepolymer.

The prepolymer is a reaction product of isophorone diisocyanate (5-isocyanato-1-(isocyanatomethyl)-1,3,3-trimethylcyclohexane) with a polyol mixture.

The polyol mixture includes i) at least one random and/or block copolymer of propylene oxide and ethylene oxide having a hydroxyl functionality of 2 to 3, a hydroxyl equivalent weight of 200 to 6000 and an oxyethylene content of 2 to 89% by weight of the copolymer. This copolymer may have a hydroxyl equivalent weight of at least 500, at least 800 or at least 900 and up to 4000, up to 3000, up to 2500, up to 2000, up to 1750 or up to 1500. The oxyethylene content of this copolymer may be at least 3%, at least 5%, at least 7%, or at least 10% and may be up to 50%, up to 30%, up to 25%, up to 20% or up to 15%.

In some embodiments, at least 50% or at least 70% of the hydroxyl groups of copolymer i) are primary. In other embodiments, fewer than 50%, fewer the 25% or fewer than 10% of the hydroxyl groups of copolymer i) are primary.

The polyol mixture further includes ii) at least one poly(ethylene oxide) monol or polyol having a molecular weight of 200 to 12,000. Component ii) is preferably a homopolymer of ethylene oxide or a copolymer of ethylene oxide with up to 10 weight percent, based on the weight of monomers, of one or more other alkylene oxides. The molecular weight of component ii) in some embodiments is at least 400, at least 600, at least 750 or at least 900 and up to 6000, up to 8000, up to 4000, up to 3000, up to 2500 or up to 2200.

Component ii) of the polyol mixture preferably has a number average of up to 3 and more preferably up to 2 hydroxyl groups per molecule. In especially preferred embodiments, component ii) has a number average of up to 1.5 or up to 1.2 hydroxyl groups per molecule.

The polyol mixture may contain one or more polyether polyols in addition to components i) and ii). An example of such a polyether polyol is iii) a poly(propylene oxide) or random and/or block copolymer of propylene oxide and ethylene oxide that contain less than 2% oxyethylene units based on the weight of the block copolymer. Polyether polyol iii) may have, for example, a hydroxyl equivalent weight of at least 250, at least 550, at least 750, at least 900, at least 1000, at least 1200 or at least 1500, up to 3000, up to 2500 or up to 2200. It may have a number average hydroxyl functionality of at least 1.8 or at least 1.95 up to 4, up to 3, up to 2.5 or up to 2.2.

In addition, the polyol mixture may contain one or more chain extenders, i.e. compounds having hydroxyl equivalent weights of less than 175 and exactly 2 hydroxyl groups per molecule and/or crosslinkers, i.e., compounds having three or more hydroxyl groups and hydroxyl equivalent weights of less than 175.

Examples of chain extenders include 1,2-ethane diol, 1,2- or 1,3-propane diol, 1,4-butane diol, diethylene glycol, triethylene glycol, dipropylene glycol, tripropylene glycol, neopentyl glycol and alkoxylates of any of the foregoing having a hydroxyl equivalent weight of less than 175.

Examples of crosslinkers include glycerin, trimethylolpropane, trimethylolethane, erythritol, pentaerythritol, triethanolamine, diethanolamine and alkoxylates of any of the foregoing having a hydroxyl equivalent weight of less than 175.

Chain extenders and crosslinkers, if present, preferably together constitute no more than 5%, more preferably no more than 2%, and even more preferably no more than 1% or no more than 0.5% of the weight of the polyol mixture. Chain extenders and crosslinkers each can be absent from the polyol mixture.

Other polyols, different from the foregoing, if present at all, preferably are present in amounts no greater than 5%, especially no greater than 3% of the total weight of the polyol mixture.

In some embodiments, the polyol mixture has an average hydroxyl functionality (average number of hydroxyl groups per molecule) of 1.5 to 3, especially 1.5 to 2.5 or 1.5 to 2.2. In some embodiments, the polyol mixture has an oxyethylene content of at least 1% by weight, at least 2% by weight or at least 3% by weight and, for example, up to 15% by weight, up to 10% by weight, up to 6% by weight or up to 5% by weight. Oxyethylene content is the weight of all oxyethylene ($-O-CH_2-CH_2-$) units in the polyol mixture divided by the weight of the polyol mixture, times 100%.

Polyol i) in some embodiments constitutes at least 1 weight percent or at least 2 weight percent of the total weight of the polyol mixture. It may constitute up to 10 weight percent, up to 7.5 weight percent, up to 5 weight percent or up to 3.5 weight percent of the total weight of the polyol mixture. An advantage of this invention is that good emulsion stability can be obtained even when only small amounts of component i) are present in the polyol mixture.

Polyol ii) in some embodiments constitutes at least 10 weight percent, at least 20 weight percent or at least 30 weight percent of the total weight of the polyol mixture. It may constitute up to 99 weight percent, up to 98 weight percent, up to 90 weight percent, up to 80 weight percent, up to 60 weight percent or up to 50 weight percent of the total weight of the polyol mixture. In some embodiments, components i) and ii) are the only polyols in the polyol mixture.

In some embodiments, polyol iii) (if present at all (constitutes at least 5 weight percent, at least 10 weight percent, at least 20 weight percent or at least 30 weight percent of the total weight polyol mixture. It may constitute up to 89 weight percent, up to 80 weight percent, up to 75 weight percent or up to 65 weight percent of the total weight of the polyol mixture.

Other polyols, including chain extenders and crosslinkers as well as other polyols different than polyols i), ii) and iii), may constitute up to 25%, up to 10%, up to 5% or up to 2% of the total weight of the polyol mixture, and may be absent.

In some embodiments, the selection and proportion of polyols within the polyol mixture is selected such that the prepolymer has an oxyethylene content as discussed below.

The polyol mixture is reacted with an excess of isophorone diisocyanate to produce the prepolymer. At least one mole of isophorone diisocyanate is reacted per equivalent of hydroxyl groups in the polyol mixture. A greater excess can be used.

The prepolymer-forming reaction can be performed under vacuum or in an inert atmosphere such nitrogen, preferably with the exclusion water, at an elevated temperature, and in the presence of a urethane catalyst such as a tertiary amine, tin, zinc or other metallic catalyst. The reaction is generally continued until the hydroxyl groups have been consumed, as indicated by a constant isocyanate content in the reaction mixture.

The prepolymer may have an isocyanate content of, for example, at least 1 weight percent, at least 2 weight percent, at least 3 weight percent or at least 4 weight percent and up to 15 weight percent, up to 12 weight percent, up to 10 weight percent, up to 8 weight percent or up to 7 weight percent. Isocyanate content is conveniently determined using well-known titration methods.

The prepolymer may have an oxyethylene content of, for example, at least 1 weight percent, at least 2 weight percent or at least 3 weight percent, based on the total weight of the prepolymer The oxyethylene content may be, for example, up to 20 weight percent, up to 15 weight percent, up to 12 weight percent, up to 10 weight percent, up to 8 weight percent, up to 6 weight percent or up to 5 weight percent on the same basis. Oxyethylene content is calculated by dividing the weight of oxyethylene ($-O-CH_2-CH_2-$) groups in the polyol mixture by the combined weight of polyol mixture and isophorone diisocyanate that are combined to form the prepolymer.

For purposes of this invention, the "prepolymer" includes reaction products of the polyol mixture with isophorone diisocyanate, plus any unreacted isophorone diisocyanate that may be present at the end of the reaction with the polyol mixture.

To make the dispersion, the prepolymer is first dispersed into an aqueous phase that includes water and an external surfactant and then reacted with the diamine chain extender to produce the polyurethane particles.

The external surfactant promotes the dispersion of the prepolymer into the aqueous phase and also helps to stabilize the final dispersion against phase separation. Examples of useful external surfactants include anionic types such as alkyl sulfates, alkyl phosphates, alkyl sulfonates, alkyl carboxylates, alkyl-ether sulfates, phosphates, sulfonates and carboxylates; alkylated aromatic sulfates, phosphates, sulfonates and carboxylates; alkyl-aryl ether sulfates, phosphates, sulfonates and carboxylates and the like. Other suitable external surfactants include alkyl quaternary ammonium salts. Still other useful surfactants are nonionic surfactants such as fatty alcohol ethoxylates, alkylphenol ethoxylates, ethoxylated amines, ethoxyated fatty acid amides, glycerol fatty acid esters, sorbitol fatty acid esters, sucrose fatty acid esters and alkyl polyglucosides.

The prepolymer may constitute, for example, 5 to 70 weight percent of the combined weight of water, surfactant and prepolymer. A preferred amount is 20 to 50 weight percent on the same basis. The surfactant may constitute, for example, 0.25 to 5 weight percent of the combined weight of water, surfactant and prepolymer. A preferred amount is 0.5 to 3 weight percent on the same basis. The water may constitute at least 29.75 weight percent of the combined weights of the water, surfactant and prepolymer.

The prepolymer, water and surfactant can be combined in any order. The surfactant may be combined with a portion of the water before mixing it with other ingredients, to simplify handling. In a convenient process, the prepolymer and most or all of the water are combined, and the surfactant is then added by itself or as a mixture with a portion of the water.

The prepolymer, water and surfactant preferably are combined under conditions at which the reaction of isocyanate groups and water is slow. These conditions may include, for example, a temperature of no greater than 30° C. or lower, especially 20° C. or lower, but at or above 0° C. to avoid freezing. It is preferred to combine the prepolymer water and surfactant in the absence of a urethane catalyst, except for (optionally) catalyst residues that may remain in the prepolymer from the prepolymer-forming reaction.

The mixture of prepolymer, water and surfactant is agitated to disperse the prepolymer into the aqueous phase and produce small prepolymer droplets. A small amount of reaction between the isocyanate groups and water may take place during this time. As before, conditions preferably are selected to disfavor the water-isocyanate reaction. The prepolymer may be dispersed into droplets having diameters of, for example, 20 nm to 50 μm. A preferred particle size range is such that at least 90 volume-percent of the particles falls within a range of 50 nm to 20 μm, especially a range of 50 nm to 1000 nm or 50 nm to 1000 nm.

Agitation can be performed in a wide variety of ways, including by stirring and other mechanical mixing; passing the materials through static mixers; ultrasonic mixing as well as others.

The dispersed prepolymer is then reacted with a diamine chain extender that contains a cycloaliphatic or aromatic ring structure and two or more, preferably exactly two, primary and/or secondary amino groups. In the case of a cycloaliphatic diamine chain extender, one or more of the amino groups may form part of a ring structure.

The diamine chain extender preferably has a molecular weight of no more than 300, especially no more than 200 or no more than 150.

Among the useful diamine chain extenders are piperazine, N-(2-aminoethyl)piperazine and N,N'-bis(2-aminoethyl)piperazine.

Other useful diamine chain extenders include cyclohexane diamine (including any one or more of the 1,2-, 1,3- and 1,4-isomers), bis(aminomethyl)cyclohexane (including any one or more of the 1,2-, 1,3- and 1,4-isomers) and bis(2-aminoethyl)cyclohexane.

Still other useful diamine chain extenders include phenylene diamine, toluene diamine, diethyltoluene diamine, bis(aminomethyl)benzene, bis(2-aminoethyl)benzene and the like. As before, any isomer or mixture of isomers can be used.

The diamine chain extender is combined with the prepolymer dispersion in an amount sufficient to provide, for example, 0.1 to 1.25 equivalents of primary and/or secondary amino groups per equivalent of isocyanate groups. A preferred amount is 0.2 to 1.0 equivalents of primary and/or secondary amino groups per equivalent of isocyanate groups. It is preferred to add the diamine chain extender to the prepolymer dispersion, and also to add the chain extender gradually to minimize locally high concentrations of the chain extender. The chain extender migrates to the prepolymer droplets where it reacts with isocyanate groups to form particles. The particles are referred to herein as "polyurethane" particles for convenience; however, those particle will contain urea groups formed in the reaction to the chain extender with the isocyanate groups as well as urethane groups formed when the prepolymer is made.

The chain-extension reaction can be performed across a wide range of temperatures, from the freezing temperature to the boiling temperature of the aqueous phase. As before, however, conditions preferably are selected to minimize the reaction of the isocyanate groups with water. Accordingly, a preferred temperature range is from 0 to 50° C. or from 10 to 40° C., and the reaction may be performed in the absence of a urethane catalyst although as before catalyst residues from the manufacture of the prepolymer may be present. A urethane catalyst may be present if a faster reaction is desired.

The diamine chain extender should be combined with the prepolymer dispersion under agitation to facilitate transfer of the diamine chain extender to the prepolymer droplets. Agitation methods as mentioned above are suitable.

Once all of the diamine chain extender is added, the reaction mixture is allowed to react, under conditions as described above, until either the amine groups or isocyanate groups (whichever is not in excess) have been consumed.

The product is a dispersion having a continuous aqueous phase and polyurethane particles dispersed within the aqueous phase. The solids content (i.e., weight of the polyurethane particles as a percentage of the entire weight of the dispersion) may be, for example, at least 1%, at least 5%, at least 10%, at least 20% or at least 25% or at least 40% and, for example, up to 70%, up to 60% or up to 50%. The particle size may be as described above with regard to the prepolymer droplets.

The dispersion preferably contains no more than containing no more than 0.5% by weight of organic compounds having a boiling point of less than 100° C. (at standard atmospheric pressure, 101 kPa absolute). Such compounds, if present in the dispersion as manufactured, preferably are stripped or otherwise removed from the dispersion so the dispersion contains no more than 0.5% by weight thereof and preferably no more than 0.1% by weight thereof. Even more preferably, the dispersion contains no more than 0.5%, especially no more than 0.1%, by weight of organic compounds having a boiling temperature of 200° C. or less at 1 standard atmosphere pressure.

The dispersion is particularly useful for making artificial leather. It can be used as manufactured for that purpose, or modified in various ways such as by dilution (preferably with water and/or other liquid that has a boiling temperature of at least 100° C., more preferably at least 200° C.), and/or the incorporation of various useful additives.

Among the useful additives are colorants such as pigments and dyes; fillers; antioxidants; preservatives; biocides; viscosity modifying agents (such as xanthan gum; various water-soluble cellulose ethers or polyacrylamide); mixing aids; wetting agents (when fillers are present) and the like.

Dispersions of the invention are useful in making artificial leather.

Artificial leather is made by forming a layer of the dispersion on a substrate, and drying and curing the layer to form a polyurethane fabric.

The substrate in some embodiments is a release paper. Such a release paper may be embossed with a grain pattern to simulate the grain pattern of an animal skin (such as cow leather), or with any other arbitrarily-chosen pattern, so the embossed pattern is transferred to the artificial leather product. In such a process, the dispersion is applied to the top surface of the release paper, spread and gauged (such as through the use of a doctor blade, air blade or similar gauging apparatus) and dried and cured to form a continuous polyurethane coating on the release paper. The release paper is then separated from the coating material to produce the artificial leather. In this process, a single polyurethane layer can be applied, or multiple layers can be applied. For example, a pigmented or otherwise colored layer can be applied to form a colored show surface that is backed with one or more polyurethane layers produced from a dispersion of this invention.

Instead of a release paper, the substrate can be selected from a variety of other materials, especially plastic films. In making artificial leather, such films preferably are releasable or have a release coating such as a silicone coating to permit the artificial leather product to be removed from the film. As before, the plastic film may be embossed to impart a pattern to the surface of the artificial leather product.

Instead of or in addition to the release paper or film, the substrate may be or include a scrim or other fibrous material. In this case, the dispersion when applied may penetrate at least partially into the substrate, producing a composite material after the dispersion is dried and cured. The scrim or other fibrous substrate serves to provide mechanical reinforcement to the artificial leather product. A further layer of the dispersion may be applied to form a multilayer product in which only one layer is reinforced with the scrim or fibrous material.

The substrate in some embodiments is a facing layer made from a different material, in which case the layer formed from the polyurethane dispersion of the invention may be present to provide mechanical strength or other useful function.

Drying and curing can be performed at a temperature range from below room temperature (such as 10° C.) up to 150° C. or higher. A preferred temperature is below the boiling temperature of the aqueous phase, to avoid forming unwanted bubbles in the product. An especially suitable temperature is 40 to 90° C. Curing can be performed at standard atmospheric pressure or at subatmospheric pressure. Curing can be done, for example, under air, oxygen or an inert atmosphere.

Further embossing or texturing can be performed during the curing step. In addition, the polyurethane layer can be laminated and/or adhered to one or more other layers during the curing step or afterward.

The artificial leather of the invention preferably contains at least one layer made from the dispersion of the invention, having a thickness of at least 0.35 mm and up to 5 mm, especially 0.5 to 3.5 mm or 0.5 to 2 mm, or two or more contiguous layers, made from the dispersion of the invention, that together have such a thickness.

The dispersion of the invention is also useful to make various types of coatings. As with the artificial leather products, the dispersion is applied to a substrate where it is dried and cured. The invention is particularly suitable for making thick coatings, having a thickness of, for example, 0.1 mm or greater, up to as much as 5 mm or up to 2.5 mm.

The following examples are provided to illustrate the invention, but are not intended to limit the scope thereof. All parts and percentages are by weight unless otherwise indicated.

In the following examples:

Polyol A is a 4000 number average molecular weight polyether diol. It is made by propoxylating and then ethoxylating a difunctional initiator compound. The oxyethylene content is 16.9% by weight.

Polyol B is a 2000 number average molecular weight polyether diol. It is made by propoxylating and then ethoxylating a difunctional initiator compound. The oxyethylene content is 12% by weight.

Polyol C is a 4000 number average molecular weight polypropylene oxide) diol.

The PEG is a 1000 molecular weight poly(ethylene oxide) monol.

The Surfactant Solution is a solution of 23% sodium dodecylbenzene sulfonate in 77% water.

The Piperazine Solution is a solution of 10% piperazine in 90% water.

The AEEA Solution is a solution of 10% aminoethylethanolamine in 90% water.

EXAMPLES 1 and 2 and COMPARATIVE SAMPLES A and B

Prepolymer Synthesis: The polyol(s) and PEG are charged to a reaction vessel and dehydrated by heating at 110° C. under vacuum. The dehydrated polyol mixture is cooled to 70-75° C. and isophorone diisocyanate is added under nitrogen, followed by the catalyst. The resulting reaction mixture is maintained at 70-75° C. with stirring for an hour and then heated to 80-85° C. for an additional 2-3 hours to produce the prepolymer.

The ingredients to make the prepolymer, and the amounts thereof, are as indicated in Table 1, as are the isocyanate content and oxyethylene content of the prepolymer.

TABLE 1

| Prepolymer Synthesis | | |
|---|---|---|
| | Parts By Weight | |
| Ingredient | Prepolymer A | Prepolymer B |
| Polyol A | 30 | 0 |
| Polyol B | 0 | 70 |
| Polyol C | 43 | 0 |
| PEG | 2 | 2 |
| Isophorone Diisocyanate | 25 | 28 |
| Tin Catalyst | 0.03 | 0.03 |
| Prepolymer Properties | | |
| Isocyanate Content, wt-% | 7.8 | 7.56 |
| Oxyethylene content, wt-% | 7 | 10.4 |

Dispersion Synthesis: The prepolymer is placed into a container and stirred on a laboratory mixer. The surfactant solution added to the prepolymer, followed by deionized water, which is in the form of a water and ice mixture having a temperature of about 0° C. Phase reversal takes place during the water addition to produce an oil-in-water emulsion. The chain extender solution is then added dropwise, followed by stirring for an additional 10 to 15 minutes to allow the chain extender and prepolymer to react to form polyurethane particles. The recipes for Examples 1 and 2 and Comparative Sample A are as given in Table 2. Comparative Sample B is a commercially available polyurethane dispersion made from a prepolymer which is a polycaprolactone-isophorone diisocyanate product. Comparative Sample B represents a polyester polyol-based dispersion.

Films are made from each of Examples 1 and 2 and Comparative Samples A and B. In each case, 22.5 g of the dispersion is diluted with an equal amount of water to produce a dispersion having about 20% solids. The diluted dispersions are degassed under vacuum and then poured into a petri dish. The dish containing the diluted dispersion is placed into a 48° C. over for 24 hours. The partially dried film thus obtained is removed from the petri dish and dried at 48° C. for another 24 hours. The resulting film is then cooled to room temperature for mechanical property testing. Results are as indicated in Table 2.

TABLE 2

| Ingredient | Parts By Weight | | | |
|---|---|---|---|---|
| | Ex. 1 | Ex. 2 | Comp. A* | Comp B* |
| Prepolymer A | 100 | 0 | 0 | Commercial Product based on Polyester polyol/isophorone diisocyanate prepolymer |
| Prepolymer B | 0 | 100 | 100 | |
| Surfactant Solution | 13 | 13 | 13 | |
| Water | 93.6 | 95.15 | 84.8 | |
| Piperazine Solution | 67.9 | 65.8 | 0 | |
| AEEA Solution | 0 | 0 | 79.6 | |
| Mechanical Properties of Dried Film | | | | |
| Tensile Strength, MPa | 29 | 31 | 19 | 34 |
| Elongation at break, % | 900 | 820 | 1100 | 633 |
| Modulus at 100% elongation, MPa | 5.11 | 4.37 | 1.11 | 5.02 |
| Tear Strength, N/mm | 76 | 64 | 11 | 67 |

The mechanical properties of Comparative Sample B are typical of polyurethanes made from a dispersion based on polyester polyol-based prepolymer. Comparative Sample A shows how conventional dispersions, based on polyether polyol-based prepolymers, fall far short of the mechanical properties of the polyester polyol-based materials. Tensile strength falls by nearly half and modulus and tear strength fall to values of about 20% or less of those of Comparative Sample B.

Examples 1 and 2 unexpectedly exhibit mechanical properties that are comparable to and in some cases even superior to those of Comparative Sample B.

EXAMPLE 3

Following the general procedure described in Examples 1 and 2, a prepolymer is prepared and then used to form a polyurethane dispersion. The recipes for the prepolymer and dispersion are indicated in Table 3. The dispersion is stable despite even though the prepolymer has a very low content of oxyethylene groups.

TABLE 3

| Ingredient | Parts By Weight |
|---|---|
| Prepolymer | |
| Polyol A | 10 |
| Polyol B | 68 |
| PEG | 2 |
| Isophorone Diisocyanate | 20 |
| Tin Catalyst | 0.02 |
| Isocyanate Content, % | 5.9 |
| Oxyethylene Content, % | 3.7 |
| Dispersion | |
| Prepolymer | 100 |
| Piperazine solution | 5.6 |
| Surfactant | 3 |
| Water | To 40% solids |
| Mechanical Properties of Dried Film | |
| Tensile Strength, MPa | 21 |
| Elongation at Break, % | 956 |
| Modulus at 100% Elongation, MPa | 3.03 |

What is claimed is:

1. An aqueous polyurethane dispersion comprising a liquid aqueous phase containing an external surfactant and dispersed nonionic polyurethane particles, and containing no more than 0.5% by weight of organic compounds having a boiling point of less than 100° C. wherein the dispersed polyurethane particles are a reaction product of a nonionic polyurethane prepolymer and a diamine chain extender that contains a cycloaliphatic or aromatic ring structure, wherein the polyurethane prepolymer is a reaction product of an excess of isophorone diisocyanate with a polyol mixture, the polyol mixture including i) at least one random and/or block copolymer of propylene oxide and ethylene oxide having a hydroxyl functionality of 2 to 3, a hydroxyl equivalent weight of 200 to 6000 and an oxyethylene content of 2 to 89% by weight of the copolymer, ii) at least one poly (ethylene oxide) monol or polyol having a molecular weight of 200 to 12,000, optionally 10 to 65 weight percent, based on the weight of the polyol mixture, of iii) at least one polypropylene oxide) or random and/or block copolymer of propylene oxide and ethylene oxide that contain less than 2% oxyethylene units based on the weight of the block copolymer, iv) optionally one or more chain extenders having hydroxyl equivalent weights of less than 175 and exactly 2 hydroxyl groups per molecule and optionally v) one or more crosslinkers having three or more hydroxyl groups and a hydroxyl equivalent weight of less than 175, wherein i), ii), iii) when present, iv) when present and v) when present together constitute at least 95% of the weight of the polyol mixture and iv) when present and v) when present together constitute no more than 5% of the weight of the polyol mixture, and wherein the polyurethane prepolymer has an isocyanate content of 1 to 15% by weight of the prepolymer and a oxyethylene content of 1.5 to 20% by weight of the prepolymer.

2. The aqueous dispersion of claim 1 wherein the diamine chain extender is piperazine.

3. The aqueous dispersion of claim 1 wherein copolymer of i) has an oxyethylene content of 5 to 30% by weight of the copolymer and a hydroxyl equivalent weight of 500 to 3000.

4. The aqueous dispersion of claim 1 wherein the poly (ethylene oxide) monol or polyol of ii) has a hydroxyl equivalent weight of 500 to 3000.

5. The aqueous dispersion of claim 1 wherein the prepolymer has an isocyanate content of 2 to 8% by weight.

6. The aqueous dispersion of claim 1 wherein the polyol mixture has an average hydroxyl functionality of 1.5 to 2.5 and an oxyethylene content of 3 to 6% by weight.

7. An artificial leather comprising at least one polyurethane layer formed by coagulating an aqueous polyurethane dispersion of claim 1.

8. A substrate having a coating layer, the coating layer comprising at least one polyurethane layer formed by coagulating an aqueous polyurethane dispersion of claim 1.

9. The aqueous polyurethane dispersion of claim 1 wherein i), ii) and iii) when present constitute 100% of the weight of the polyol mixture.

* * * * *